Sept. 22, 1936.    R. R. GOULD    2,054,976
FISHHOOK
Filed April 22, 1935
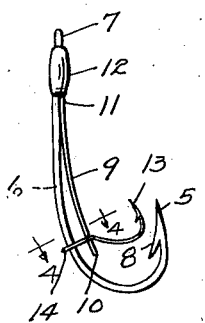
FIG. 1
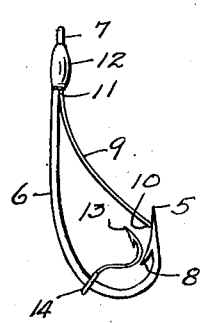
FIG. 2
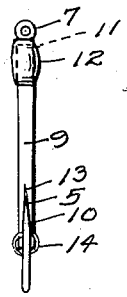
FIG. 3
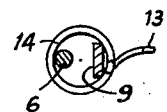
FIG. 4
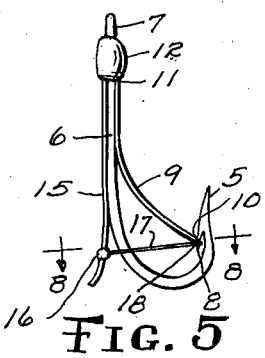
FIG. 5     FIG. 6
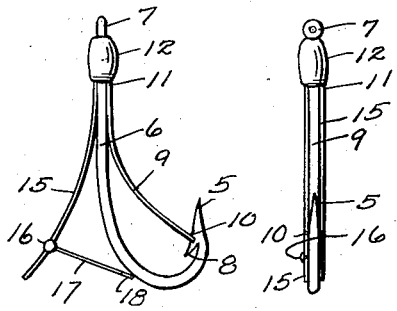
FIG. 7
FIG. 8
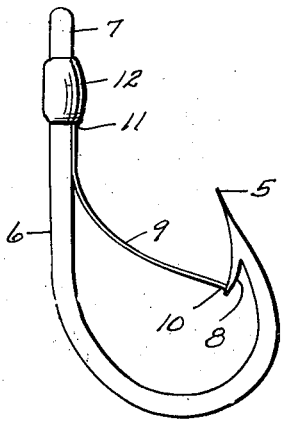
FIG. 9
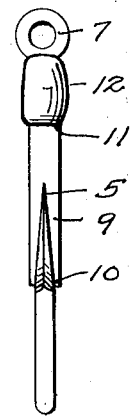
FIG. 10
INVENTOR.
ROBERT R. GOULD
BY
Frank D. Gray
ATTORNEY.

Patented Sept. 22, 1936

2,054,976

UNITED STATES PATENT OFFICE 2,054,976

FISHHOOK

Robert R. Gould, Dallas, Tex.

Application April 22, 1935, Serial No. 17,609

5 Claims. (Cl. 43—38)

This invention relates to a new and improved fish hook having the usual barbed point shaped in more or less conventional form, and also having a flat, curved spring rigidly secured to the shank of the hook by welding or soldering one end of said spring to the shank, and positioning the opposite end of the spring normally adjacent the barb of the hook, but permitting the spring to straighten, when pressure is applied thereto away from the barb, toward the curved body of the hook to thereby open a clear space between the barb and the spring end, for entrance of the jaw of the fish thereinto, and when impaled on the hook point.

Any pressure exerted from within the opened spring to withdraw from the hook, tends to hold the fish on the hook by the movement of the spring to return to normal position.

While the hook structure in which the strong spring, which will usually be a flat leaf spring, will be embodied, is preferably adapted for normally bridging the space between the barb and the shank, many forms of my device having this closed feature may well be provided with means for setting the hook for sudden tripping to positively impale the fish thereon, when slight pressure exerted downwardly against the point, releases the spring to return to the normal position near the point. Such leaf spring mounted on the hook shank may be used, with or without the said setting means for the tripping action, so that the leaf spring attachment may be used with several embodiments thereof more or less common to the several hook structures.

With these and other objects in view, as they will appear as the description proceeds, my invention comprises certain novel features of construction hereinafter described in the specification, recited in the claims, and illustrated in the accompanying drawing, in which,—

Figure 1 shows a side elevation of one form of my fish hook;

Figure 2 is a similar elevation showing the spring released;

Figure 3 is a front elevation of structure shown in Fig. 2;

Figure 4 is a sectional fragmentary view showing the section taken in the plane indicated by the line 4—4 of Fig. 1;

Figures 5 and 6 show side elevations of a modified form of fish hook, in the "set" and released positions, respectively;

Figure 7 is a front elevation of the form shown in Fig. 5;

Figure 8 is a horizontal section taken in the plane indicated by the line 8—8 of Fig. 5; and Figures 9 and 10 show side and front elevations, respectively, of my improved fish hook with the leaf spring in normal position on the hook.

The improved fish hook here disclosed comprises the usual up-turned point 5 integral with the main shank 6 solid, strong and ending with an eye 7 for the usual attaching means. It is desirable to employ the ordinary barb 8 directed downwardly and inwardly to assist in retaining the fish, when once caught by insertion of the point 5. My novel structure embodies therein, a flat, though curved, leaf spring 9 whose lower end 10 will normally rest closely adjacent the barb 8, and sometimes positioned near the hook point 5. This spring 9 is rigidly attached at its upper end 11 to the hook shank 6, by welding or soldering them together forming a protuberance 12 on said shank.

This spring will normally remain substantially in contact with the barb 8 until some pressure bears downwardly upon the lower end 10 when it yields to such pressure as by the struggle of a fish on the point 5 tending to escape from the latter, which struggle serves to open the spring end 10 and secure the fish on the point 5 with still greater force, while attempt to move upwardly away from the end 10, serves to force the barb point 8 into the flesh of the jaw, the spring end 10 acting to clamp parts 8 and 5 into the fish as the spring normally moves the fish against these sharp points. The thin, leaf spring 9 is particularly well adapted for this function.

The position and relative assemblage of the parts 5, 6, and 8 to 12, inclusive, are substantially identical in the several forms of fish hook shown in the drawing. However, this common structure is well adapted to receive for use with it a second and much smaller hook 13 which will serve a purpose of holding the end 10 of the spring 9 in a position more nearly parallel with the shank 6, as shown in Fig. 1, which is done by the provision of a loop 14 on one end of such hook 13 through which the shank is threaded, and the loop or eye 14 being large enough to receive therein the end 10 of the spring 9, and retain the small hook 13 adjacent the hook 5 in a "set" position, but slightly advanced above the level of the hook point 5, until the spring is released. The eye 14 is slidable upon the shank 6.

It is a further purpose of the hook 13 to receive thereon live bait such as a minnow which will be held for a longer time though permitting movement thereof while living, than live bait is ordinarily retained in such position. The hook 13 may be drawn down into the position shown in Fig. 2 while the spring end 10 is pressed toward the shank 6, when the hook 13 may be pushed upward to the first position to receive the end 10 again in the eye 14. The release of the spring end will evidently serve to impale the fish on the hook 5 and retain it there against struggling to be released. It will be evident that slight pressure upon the hook point 13 will trip the latter and release the spring.

In Figs. 5, 6, 7, and 8, is shown the spring 9, shank and hook point 5, as in the other forms, but is here shown with an outer and additional leaf spring 15 positioned in parallelism with the upper end 11 of the spring 9, the two spring ends being welded or soldered at the common protuberance 12 upon the shank 6. At a point 16 slightly spaced from the end of the outer spring 15, is provided an extended wire 17 welded thereto.

The wire or slender rod 17 is rigidly attached at 16 to one edge of spring 15, so that the rod may extend to the barb 8 by clearing the hook shank 6 on one side thereof, as shown clearly in Fig. 5. On the remote end of the rod 17 is provided a small loop 18 which, when the spring 15 is forcibly pressed forward from its normal or released position in Fig. 6, to the "set" position of Fig. 5 in which the spring 15 is more nearly straight, may then enclose the barb 8 to retain the parts in their set position, the loop 18 then being immediately beneath the end 10 of the spring 9 which is in its normal position in Figs. 5 and 6.

Since the spring 15 is shown in Figs. 5 and 8, under tension, it will be evident that a rear pressure exerted on the parts 5 and 10 by a fish, as when it grasps bait on the hook, will also contact the end 10 and press the latter rearwardly against the loop 18, thereby releasing the same from the barb 8 and permitting the spring 15 to return to its normal position in Fig. 6 which serves to space the remote ends of the two springs apart, as well as positively space the end of 15 outwardly from the shank 6. This latter action greatly spaces the spring 15 from the point 5, and thereby more positively inserts such point 5 into the flesh of the fish, and prevents escape from the hook.

Recapitulating; all forms of the improved fish hook here illustrated, disclose the flat, thin leaf spring attached at its upper end rigidly upon the shank 6 of a hook having a barb 8, the said spring being normally curved away from the said shank and of proper length to be positioned substantially adjacent said barb, and permitting swinging inwardly and downwardly away from said barb upon receiving downward pressure thereon, as by a bite of a fish attempting to grasp bait held on the hook point 5, or on a smaller hook 13, as in the first form. The end 11 of the spring 9 is soldered or welded at 12 upon the hook shank, in all forms.

The forms of my invention shown in the first eight views of the drawing, all show a spring which is a leaf spring soldered or welded to the shank of the hook, and also provide a particular means for holding the lower end of the spring under tension and which, when the means stated is tipped, releases the leaf spring to make more certain and positive the impaling of the fish on the main hook point 5. In Figs. 1 to 4, the loop 14 is slipped off the spring end 10; and in Figs. 5 to 8, the loop 18 is slipped off the barb 8 to release the rod 17 and its spring 15.

Having described my invention, what I claim and desire to secure by Letters Patent is,—

1. A fishing device comprising a hook having an upturned point and a downwardly and inwardly directed barb, a leaf spring rigidly secured at its upper end upon the shank of the hook, by soldering or welding, thereby forming an integral metal protuberance, and having at its lower end a portion normally curved in a direction away from the hook shank, and adapted to be pressed manually toward said shank, a trip device having a loop or eye at one end thereof for engaging loosely a portion of the hook to retain the end of the spring under tension, but yieldable to pressure from above by a fish to trip the device to release the tensioned spring to move away from the shank and exert pressure on the point when the fish struggles to escape.

2. A fishing device comprising a hook having an upturned point and a downwardly and inwardly directed barb, a leaf spring rigidly secured at its upper end upon the shank of the hook by soldering or welding, thereby forming an integral metal protuberance upon said shank, and having at the lower end of said spring a portion normally curved in a direction away from the hook shank, and adapted to be pressed under tension manually toward said shank, a trip member having a loop at one end thereof for enclosing loosely a portion of said hook and to receive on said loop the tension end of said spring to retain the latter in said tensioned position, but said loop being yieldable to pressure downward away from said protuberance by a fish to trip the wire loop to release the tension end of the spring to permit the latter end to move away from the shank and exert pressure on the point when the fish struggles to escape.

3. A fishing device comprising a hook having an upturned point and a downwardly directed barb, a leaf spring rigidly secured at one end to the inner surface of the hook shank by an integral metal protuberance, and having the opposite end thereof movable away from the shank to normally exert pressure against said barb, but yieldable downwardly away from said barb and point and under tension manually to set said spring, a trip member having at one end a loop for receiving therethrough the shank of the hook, and at the other end a smaller hook integral with said loop, the latter being sufficiently large to receive therein the lower end of said leaf spring when under tension, and slidable on the shank to release said spring end while the points of both hooks point upwardly in substantial parallelism when the spring is set within the loop, and the spring end returns adjacent the barb when the small hook is tripped, to prevent the escape of the fish caught on the large hook.

4. A fishing device comprising a hook including a shank and a barb, a yieldable member secured at one end to the shank and having the other end free and normally disposed adjacent the barb, and a looped member loosely disposed on the hook and adapted to engage the free end of the yieldable member to releasably hold the yieldable member under tension and away from the barb.

5. A fishing device comprising a hook including a shank and a barb, a yieldable member secured at one end to the shank and having the other end free and normally disposed adjacent the barb, and a relatively small hook provided with a relatively large eye loosely engaging about the shank of the first hook, the eye of the small hook being adapted to engage the free end of the yieldable member to releasably hold the yieldable member under tension and away from the barb.

ROBERT R. GOULD.